July 16, 1963     R. N. IVERSEN     3,097,866

PRESSURIZED HOSE END

Filed Nov. 14, 1960

INVENTOR.
RICHARD N. IVERSEN
BY
RICHEY, McNENNY, & FARRINGTON
ATTORNEYS

United States Patent Office 3,097,866
Patented July 16, 1963

3,097,866
PRESSURIZED HOSE END
Richard N. Iversen, Mayfield Heights, Ohio, assignor to The Weatherhead Company, Cleveland, Ohio, a corporation of Ohio
Filed Nov. 14, 1960, Ser. No. 68,974
2 Claims. (Cl. 285—18)

This invention relates generally to hose coupling devices and more particularly to quick attachable hose couplings or fittings adapted to connect a flexible hose to a rigid fitting member.

It is an object of this invention to provide a novel quick attachable hose end fitting or coupling which employs fluid pressure to apply the force necessary to lock the fitting in place on the hose end.

It is another object of this invention to provide a novel quick attachable hose end fitting or coupling in which the locking operation employs only axial movement of the locking parts without accompanying rotational movement.

It is another object of this invention to provide a novel quick attachable hose end which is of single unit construction and requires no assembly of separate parts for attachment to a hose end.

It is another object of this invention to provide a novel hose end fitting which allows rapid removal and replacement of a flexible hose attached to the end fitting while the latter is connected to other members without removal or disassembly of any of the hose end fitting structure.

It is another object of this invention to provide a novel quick attachable hose end fitting which is capable of being easily unlocked for removal of the hose and which is reusable for subsequent reattachment of a hose to the hose end fitting.

It is another object of this invention to provide a novel hose end fitting which provides positive and rigid clamping of the hose while allowing the hose to be quickly attached or removed from the hose end fitting.

Further objects and advantages of this invention will readily become apparent from the following detailed description of the invention in conjunction with the accompanying drawings in which.

Figure 1:
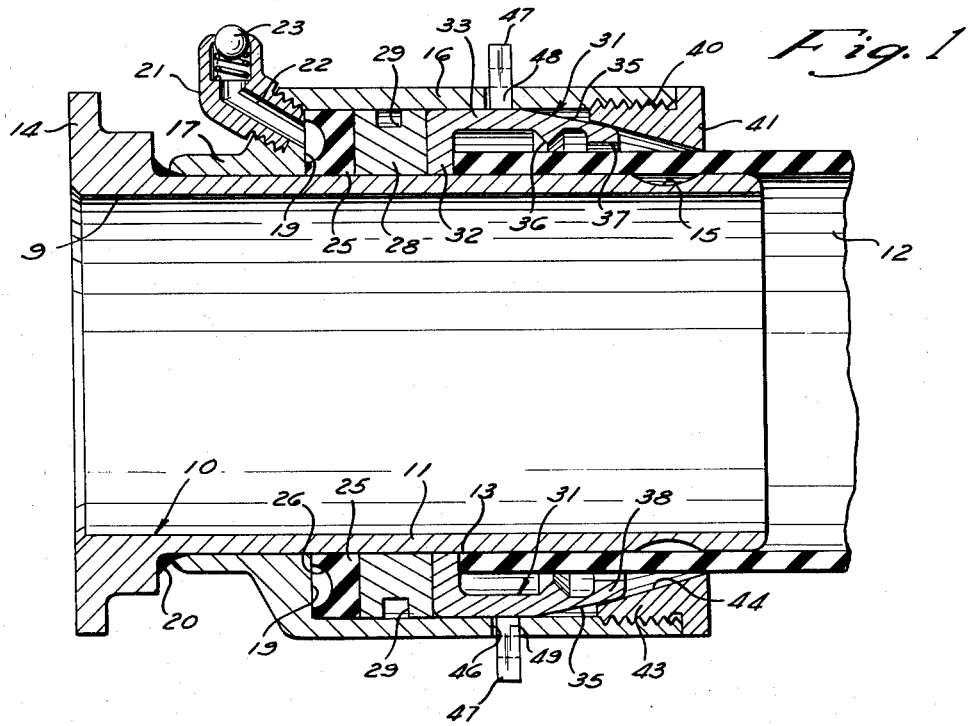
FIG. 1 is a cross-sectional view of a hose end fitting according to the present invention with a hose in place but with the fitting unclamped.

Referring now to the figures in greater detail, the hose end fitting or coupling includes a body member 10 having an elongated tubular insert portion 11 which is adapted to fit within the end of the flexible hose indicated at 12. The flexible hose for use with this fitting may be of the well known fabric reinforced type or of any other type sufficiently resilient to be deformably gripped by the clamping members of the coupling. At its one end, body member 10 has a radially extending flange 14 having a suitable configuration for attachment either to another hose coupling or to other fluid system parts such as valves and the like. Because of the relatively thin wall of insert portion 11, the bore 9 extending through the body member 10 has substantially the same inner diameter as that of the flexible hose 12, and the fitting therefore presents relatively little restriction to fluid flow. The outer surface of the insert portion 11 is cylindrical and unbroken except for a shallow circumferential groove 15 extending around its outer periphery a spaced distance from the end of the insert opposite the flange 14.

A sleeve member 16 extends around the insert portion 11 of the body member 10 and is spaced away therefrom to form an annular chamber 18 extending the greater part of the length of sleeve member 16. In order to secure the sleeve member 16 on body member 10, at one end, the sleeve member is provided with a reduced collar portion 17 which forms the end wall 19 of annular chamber 18 and extends along insert portion 11 to a point adjacent the flange 14 to position the sleeve member 16 on the body member 10. Sleeve member 16 is secured in place by a weld 20 adjacent the ends of the collar portion 17 and the flange 14.

A pressure inlet fitting 21 is attached to the sleeve member 16 on the reduced portion 17 to admit fluid pressure into the annular chamber 18. Fitting 21 has an internal passageway 22 opening into the annular chamber 18 through the end wall 19, and passageway 22 is adapted to be closed off at the outer end to prevent the escape of fluid from within the annular chamber 18 by means of a check valve assembly shown at 23. The application of fluid pressure to fitting 21 will cause the check valve 23 to open and allow fluid to pass inward through the fitting 21 to chamber 18, while the check valve closes to prevent escape of fluid within chamber 18 outwardly through the fitting unless the check valve is intentionally opened. It will be understood, however, that fitting 21 may be of any type suitable for connection with a fluid pressure source and that the invention is operative without the check valve 23.

An annular sealing ring 25 formed of a suitable resilient material such as rubber is fitted within annular chamber 18 to make sealing contact radially across the chamber to prevent the leakage of fluid past the seal. The annular sealing member 25 is provided with an annular groove 26 on its face adjacent the end wall 19, both to provide a chamber to receive fluid when the seal is in abutting contact with the end wall 19, and to form lips on the radially inner and outer edges of the seal to provide more effective sealing contact against the insert and the outer sleeve member. An annular piston 28 is positioned within annular chamber 18 outwardly from the seal member 25. The outer periphery of piston 28 is provided with a circumferential groove 29 for locking purposes as will be described in greater detail hereinafter.

Figure 3:
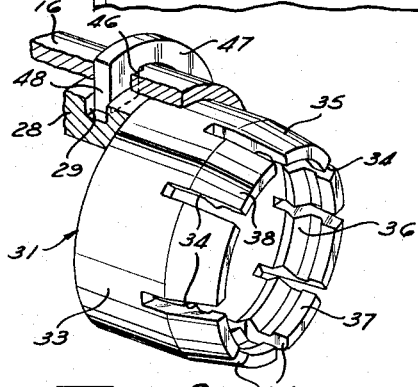
FIG. 3 is an enlarged perspective view of the clamping ring shown in FIGS. 1 and 2.

A clamping ring 31, which is shown in greater detail in the perspective view of FIG. 3, is fitted within annular chamber 18 outwardly of annular piston 28. The clamping ring 31 has an outer diameter to make a sliding fit within the sleeve member 16 and is generally spaced away from the insert portion 11 of the body member 10. At its axially inner end the clamping ring is provided with an inwardly turned flanged portion 32 adjacent the annular piston 28 to make bearing contact therewith. It will be noted that the inner end 13 of the flexible hose 12 extends into the hose fitting to make abutting contact with the flanged portion 32 to position the hose relative to the insert portion 11 and the clamping ring. Clamping ring 31 includes an axially extending portion 33 which extends outwardly along the hose between the hose and the sleeve member 16. The axially outer portion of the clamping ring is cut by axially extending sawed slots 34 which divide the ring circumferentially into fingers 38 which are resiliently flexible in a radial direction. The outer ends of the fingers 38 have their outer periphery formed into a conical taper as indicated at 35, while the inner surface of these fingers carry circumferentially extending inner and outer projecting ridges, 36 and 37, respectively.

At its outer end the sleeve member 16 is provided with internal threads 40 to receive the threaded shank 43 of a flanged nut 41. The nut 41 is provided with a conical surface 44 on its inner periphery adjacent the clamping ring 31. This conical surface 44 has substantially the same angle of taper as the conical portion 35 on clamping ring 31. The sleeve member 16 is provided with a pair of radially extending holes 46 through the side wall a spaced distance from the outer end to receive the inwardly bent ends 48 and 49 of a snap ring 47. It will be understood that snap ring 47 is generally semi-circular in shape so that the ends 48 and 49 lie on diametrically opposed portions of the sleeve member and are normally biased radially inward with the body of the snap ring extending around one-half of the periphery of the sleeve.

When the hose fitting is in the unclamped position shown in FIG. 1, there is sufficient clearance between the outer periphery of insert portion 11 and the ridges 36 and 37 on clamping ring 31 and the inner periphery of nut 41 to allow the hose 12 to be slipped into place over the insert portion 11 until the hose end 13 comes into abutting contact with the inwardly turned flanged portion 32 of the clamping ring. After the hose has been properly positioned, the hose fitting is ready for clamping, and for this purpose a source of fluid pressure is connected to the fitting 21. It is understood that the nature of this source of fluid pressure is not critical and any fluid medium may be employed so long as the pressure is sufficient to clamp and lock the coupling in the manner to be described hereinafter. Accordingly, it is contemplated that the source of fluid pressure may be compressed air from an ordinary air pressure line, a hydraulic pump, or grease supplied from a pressure grease gun of the type used for lubrication purposes.

The pressurized fluid from the supply source enters through the connecting fitting 21 past the check valve assembly 23 to fill the portion of the annular chamber 19 between end wall 19 and the annular seal member 25. The force applied by the fluid pressure therefore tends to shift the seal member 25, annular piston 28 and clamping ring 31 outwardly away from the end wall 19 and toward the nut 41. As the clamping ring 31 is shifted toward nut 41, the effect of the conical taper 35 on the fingers 38 moving against the conical surface 44 on nut 41 causes these fingers 38 to be deflected inwardly to bite into the outer surface of the hose. As a result of the movement of the flanged portion 32 of clamping ring 31, the flexible hose 12 is shifted axially outwardly at the same rate as the clamping ring so that the ridges 36 and 37 remain in alignment at the same points on the outer surface of the hose. As the fingers 38 on clamping ring 31 are forced inwardly to cause the ridges 36 and 37 to bite into the outer covering of the hose, the axial movement of the clamping ring causes these ridges 36 and 37 to be shifted into a position opposite the shallow groove 15 on the outer periphery of the insert portion 11. Thus the inward movement of the ridges 36 and 37 forces the hose wall radially inward to fill groove 15 and thereby cause maximum gripping of the hose without an excessive penetration by the ridges 36 and 37 which would weaken the hose material.

Figure 2:
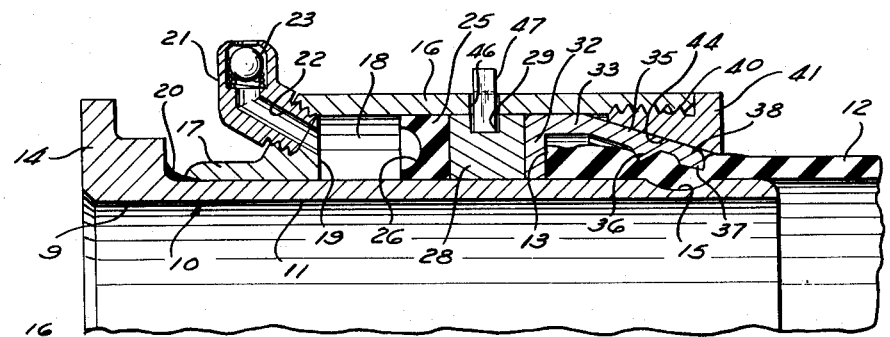
FIG. 2 is a fragmentary cross-sectional view similar to FIG. 1, but showing the hose end fitting in the clamped position.

Once the clamping ring 31 is shifted into the clamped position as shown in FIG. 2, the hose is gripped tightly between the insert portion 11 and the sleeve member 16 by virtue of the engagement of the hose in groove 15 and with the ridges 36 and 37, while the actual compression and cutting of the hose material is held to a minimum by virtue of the alignment of the ridges 36 and 37 with the groove 15.

When the fluid pressure has advanced the clamping ring 31 into the clamped position of FIG. 2, the annular piston 28 has moved to a position where the circumferential groove 29 is in alignment with the holes 46 in sleeve member 16. This allows the inwardly bent ends 48 and 49 of snap ring 47 to snap inwardly to interlocking engagement with grooves 29. By virtue of this interlocking engagement with the snap ring ends 48 and 49, the piston 28 is firmly locked in position relative to sleeve member 16 and retains the clamping ring 31 in the clamped position. Once this locking has taken place, the fluid pressure source may be disconnected from fitting 21 and the coupling will remain locked in this position. If so desired, the check valve 23 may then be opened to allow escape of the fluid under pressure within the annular chamber 19, but this is not necessary and the check valve may be left closed to retain the fluid under pressure within the chamber and thereby maintain the axial force on the seal member 25 and piston 28 and partially relieve the thrust load on the snap ring ends 48 and 49.

The hose fitting is of the re-usable type to allow the hose to be removed and replaced as necessary. Accordingly, the fitting can be unclamped to disconnect the hose in the following manner. Fluid pressure is reapplied through fitting 21 to tend to force the seal member 25 and piston 28 farther toward the clamped position in order to remove the axial thrust load tending to bind the snap ring ends 48 and 49 in place within the circumferential groove 29. The ends of the snap ring may then be forced radially outward by means of a suitable expanding tool to disengage the ends 48 and 49 from circumferential groove 29. After this has been done, the pressure within the annular chamber 18 is released, either by opening the check valve assembly 23 or alternatively, by removing the fitting 21 from sleeve member 16. Because the clamping ring 31 is resilient, the fingers 38 tend to flex radially outward, and as a result, the camming action of the conical surface 35 on fingers 38 acting on the conical surface 44 of nut 41 will tend to force the clamping ring 31 and hence piston 28 and seal member 25 rearwardly toward the end wall 19 of annular chamber 18. If friction between the conical camming surfaces causes the clamping ring to stick, an axial force applied to the hose in the direction of the fitting will assist the unclamping. When the clamping ring 31 is returned to the unclamped position shown in FIG. 1, the fingers 38 spring radially outward to disengage the ridges 36 and 37 from the outer surface of the hose. Since the hose is no longer gripped by the clamping ring, it may be pulled out of the fitting.

In the event that the above described method fails to release the locking ring 31, the nut member 41 may be loosened and unscrewed from sleeve member 16 to free the fingers 38 and allow them to spring away from the hose. It will be seen that once the hose fitting has been unclamped and the hose removed, the fitting is available for reuse with a new hose.

If it is desired to have the hose fitting permanently attached to the hose, the hose fitting may be clamped using an alternative method. In this case a liquid thermosetting plastic, such as an epoxy resin, which sets by heat or by polymerization is used to fill the annular chamber 18 and maintain the annular piston 28 and clamping ring 31 in the clamped position. The liquid plastic may be used as the pressurized fluid for clamping the fitting or else it may be injected into the chamber after clamping has been effected by a different fluid. The snap ring 47 is left in place to lock the piston 28 while the plastic hardens, but after the plastic has hardened, the snap ring and the fitting 21 may be removed, since the hardened plastic will hold the locking ring 31 firmly in the clamped position.

It is understood that the invention is not limited to the particular embodiment shown and described, and various modifications may be made without departing from the scope of the invention as defined in the appended claims.

What is claimed is:

1. A hose coupling for attachment to the end of a hose comprising a sleeve adapted to fit over the end of the hose, a tubular insert secured within said sleeve and adapted to fit within the hose, said sleeve and said insert defining an annular chamber therebetween, an annular piston within said annular chamber and spaced from the end of the hose, an annular groove on the outer periphery of said piston, a clamping ring within said annular chamber, said clamping ring having a plurality of resilient fingers extending axially over the outer periphery of the hose, said sleeve having a conical cam portion engageable by the ends of said resilient fingers, means to admit fluid pressure from an exterior source into said annular chamber to apply an axial force to said annular piston to shift said piston and said clamping ring toward said cam portion whereby said cam portion forces said resilient fingers radially inward to grip the hose, and spring loaded detent means adapted to snap into said piston groove to retain said piston and said clamping ring in the clamped position, said detent means being releasable out of said groove to allow retraction of said piston and said clamping ring to release the hose.

2. A hose coupling as set forth in claim 1 wherein said conical cam portion is on a cam member separately secured by screw threads to said sleeve to allow its removal for release of said resilient fingers.

References Cited in the file of this patent

UNITED STATES PATENTS

| | | |
|---|---|---|
| 1,130,473 | Brown | Mar. 2, 1915 |
| 1,486,421 | Dyer | Mar. 11, 1924 |
| 2,111,956 | Baldwin | Mar. 22, 1938 |
| 2,485,976 | Main | Oct. 25, 1949 |
| 2,535,016 | Launder | Dec. 19, 1950 |
| 2,670,973 | Ginther | Mar. 2, 1954 |
| 2,689,754 | Dunton | Sept. 21, 1954 |
| 2,916,305 | Sherman | Dec. 8, 1959 |